United States Patent
Roy et al.

(10) Patent No.: US 9,610,542 B2
(45) Date of Patent: Apr. 4, 2017

(54) COMPOSITE POLYAMIDE MEMBRANE WITH INCREASED CARBOXYLIC ACID FUNCTIONALITY

(71) Applicant: Dow Global Technologies LLC, Midland, MI (US)

(72) Inventors: Abhishek Roy, Edina, MN (US); Tina L. Arrowood, Elko New Market, MN (US); Robert C. Cieslinski, Midland, MI (US); David D. Hawn, Midland, MI (US); Steven D. Jons, Eden Prairie, MN (US); Mou Paul, Edina, MN (US); Martin H. Peery, Bloomington, MN (US); XiaoHua Qiu, Midland, MI (US); Steven Rosenberg, Shorewood, MN (US); Ian A. Tomlinson, Midland, MI (US); Chengli Zu, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 128 days.

(21) Appl. No.: 14/406,994

(22) PCT Filed: Jul. 3, 2013

(86) PCT No.: PCT/US2013/049178
§ 371 (c)(1),
(2) Date: Dec. 10, 2014

(87) PCT Pub. No.: WO2014/014664
PCT Pub. Date: Jan. 23, 2014

(65) Prior Publication Data
US 2015/0129485 A1 May 14, 2015

Related U.S. Application Data

(60) Provisional application No. 61/775,777, filed on Mar. 11, 2013, provisional application No. 61/775,814, filed on Mar. 11, 2013, provisional application No. 61/675,412, filed on Jul. 25, 2012, provisional application No. 61/674,634, filed on Jul. 23, 2012, provisional application No. 61/673,453, filed on Jul. 19, 2012, provisional application No. 61/673,456, filed on Jul. 19, 2012, provisional application No. 61/673,462, filed on Jul. 19, 2012, provisional application No. 61/673,466, filed on Jul. 19, 2012, provisional application No. 61/673,467, filed on Jul. 19, 2012.

(51) Int. Cl.
| | | |
|---|---|---|
| B01D 39/00 | (2006.01) | |
| B01D 39/14 | (2006.01) | |
| B01D 71/56 | (2006.01) | |
| B05D 5/00 | (2006.01) | |
| B01D 67/00 | (2006.01) | |
| B01D 69/12 | (2006.01) | |
| B01D 61/02 | (2006.01) | |
| B01D 69/10 | (2006.01) | |

(52) U.S. Cl.
CPC ....... B01D 67/0006 (2013.01); B01D 61/025 (2013.01); B01D 67/0002 (2013.01); B01D 69/10 (2013.01); B01D 69/12 (2013.01); B01D 69/125 (2013.01); B01D 71/56 (2013.01); B01D 2323/00 (2013.01); B01D 2323/38 (2013.01); B01D 2323/40 (2013.01); B01D 2325/20 (2013.01)

(58) Field of Classification Search
CPC ........ B01D 2313/105; B01D 2313/125; B01D 2313/21; B01D 2313/26; B01D 2313/54; B01D 2317/04; B01D 2317/06; B01D 2321/185; B01D 63/02; B01D 65/02
USPC .............................. 210/500.38, 490; 427/244
See application file for complete search history.

(56) References Cited

U.S. PATENT DOCUMENTS

| | | | |
|---|---|---|---|
| 3,304,310 A | 2/1967 | Hari et al. | |
| 3,686,116 A | 8/1972 | Rio | |
| 3,878,109 A | 4/1975 | Ikeda et al. | |
| 4,259,183 A | 3/1981 | Cadotte | |

(Continued)

FOREIGN PATENT DOCUMENTS

| | | |
|---|---|---|
| CN | 1035338 | 9/1989 |
| CN | 1935338 | 3/2007 |
| CN | 102219673 | 7/2014 |
| EP | 0556569 | 11/1993 |
| JP | 53146275 | 12/1978 |
| WO | 2010120326 | 10/2010 |
| WO | 2013048762 | 4/2013 |
| WO | 2013048763 | 4/2013 |
| WO | 2013103666 | 7/2013 |
| WO | 2014014662 | 1/2014 |
| WO | 2014014666 | 1/2014 |

(Continued)

OTHER PUBLICATIONS

Li et al, Polyamide thin film composite membranes prepared from isomeric biphenyl tetraacyl chloride and m-phenylenediamine, Journal of Membrane Science 315, (2008) 20-27.

(Continued)

*Primary Examiner* — Ana Fortuna
(74) *Attorney, Agent, or Firm* — Edward W. Black

(57) ABSTRACT

A thin film composite membrane including a porous support and a thin film polyamide layer characterized by having a dissociated carboxylate content of at least 0.45 moles/kg at pH 9.5 and a method for making a composite polyamide applying a polar solution comprising a polyfunctional amine monomer and a non-polar solution comprising a polyfunctional amine-reactive monomer to a surface of the porous support and interfacially polymerizing the monomers to form a thin film polyamide layer, wherein the method is characterized by the non-polar solution comprising at least 0.025 wt % of an acid compound including at least one carboxylic acid moiety and at least one amine-reactive moiety selected from acyl halide and anhydride.

6 Claims, No Drawings

(56) References Cited

U.S. PATENT DOCUMENTS

| | | | |
|---|---|---|---|
| 4,277,344 A | 7/1981 | Cadotte | |
| 4,529,646 A | 7/1985 | Sundet | |
| 4,606,943 A | 8/1986 | Rak et al. | |
| 4,626,468 A | 12/1986 | Sundet | |
| 4,643,829 A | 2/1987 | Sundet | |
| 4,719,062 A | 1/1988 | Sundet | |
| 4,758,343 A | 7/1988 | Sasaki et al. | |
| 4,761,234 A | 8/1988 | Uemura et al. | |
| 4,769,148 A | 9/1988 | Fibiger et al. | |
| 4,783,346 A | 11/1988 | Sundet | |
| 4,812,238 A * | 3/1989 | Cadotte | B01D 67/0093 210/500.3 |
| 4,812,270 A | 3/1989 | Cadotte et al. | |
| 4,830,885 A | 5/1989 | Tran et al. | |
| 4,872,984 A | 10/1989 | Tomaschke | |
| 4,888,116 A | 12/1989 | Cadotte et al. | |
| 4,948,507 A | 8/1990 | Tomaschke | |
| 4,950,404 A | 8/1990 | Chau | |
| 4,960,517 A | 10/1990 | Cadotte | |
| 4,964,998 A * | 10/1990 | Cadotte | B01D 61/025 210/500.38 |
| 5,015,380 A | 5/1991 | Sundet | |
| 5,015,382 A | 5/1991 | Sundet | |
| 5,019,264 A | 5/1991 | Arthur | |
| 5,049,282 A | 9/1991 | Linder et al. | |
| 5,051,178 A | 9/1991 | Uemura et al. | |
| 5,160,619 A | 11/1992 | Yamaguchi et al. | |
| 5,246,587 A | 9/1993 | Tomaschke | |
| 5,254,261 A | 10/1993 | Tomaschke et al. | |
| 5,290,452 A | 3/1994 | Schucker | |
| 5,336,409 A | 8/1994 | Hachisuka et al. | |
| 5,510,527 A | 4/1996 | Hachisuka et al. | |
| 5,576,057 A | 11/1996 | Hirose et al. | |
| 5,582,725 A | 12/1996 | McCray et al. | |
| 5,593,588 A | 1/1997 | Kim et al. | |
| 5,614,099 A | 3/1997 | Hirose et al. | |
| 5,616,249 A | 4/1997 | Hodgdon | |
| 5,693,227 A | 12/1997 | Costa | |
| 5,733,602 A | 3/1998 | Hirose et al. | |
| 5,744,039 A | 4/1998 | Itoh et al. | |
| 5,755,964 A * | 5/1998 | Mickols | B01D 71/56 210/490 |
| 5,783,079 A | 7/1998 | Kumano et al. | |
| 5,843,351 A | 12/1998 | Hirose et al. | |
| 5,876,602 A | 3/1999 | Jons et al. | |
| 5,989,426 A | 11/1999 | Hirose et al. | |
| 6,024,873 A | 2/2000 | Hirose et al. | |
| 6,086,764 A | 7/2000 | Linder et al. | |
| 6,162,358 A | 12/2000 | Li et al. | |
| 6,245,234 B1 | 6/2001 | Koo et al. | |
| 6,280,853 B1 | 8/2001 | Mickols | |
| 6,337,018 B1 | 1/2002 | Mickols | |
| 6,406,626 B1 * | 6/2002 | Murakami | B01D 69/00 210/500.37 |
| 6,464,873 B1 | 10/2002 | Tomaschke | |
| 6,521,130 B1 | 2/2003 | Kono et al. | |
| 6,562,266 B2 | 5/2003 | Mickols | |
| 6,723,241 B2 | 4/2004 | Mickols | |
| 6,723,422 B1 | 4/2004 | Hirose et al. | |
| 6,777,488 B1 | 8/2004 | Araki et al. | |
| 6,878,278 B2 * | 4/2005 | Mickols | B01D 71/56 210/490 |
| 7,279,097 B2 | 10/2007 | Tomioka et al. | |
| 7,806,275 B2 | 10/2010 | Murphy et al. | |
| 7,815,987 B2 | 10/2010 | Mickols et al. | |
| 8,147,735 B2 | 4/2012 | Buschmann | |
| 8,177,928 B2 * | 5/2012 | Ohki | C21D 1/18 148/589 |
| 8,177,978 B2 * | 5/2012 | Kurth | B01D 61/002 210/490 |
| 8,968,828 B2 * | 3/2015 | Roy | B01D 67/0093 210/500.38 |
| 9,051,412 B2 * | 6/2015 | Reese | C08G 18/4858 |
| 9,071,227 B2 * | 6/2015 | Uejima | H04B 1/48 |
| 9,289,929 B2 * | 3/2016 | Franksson | B29C 45/162 |
| 9,397,196 B2 * | 7/2016 | Sim | H01L 29/66795 |
| 2001/0050252 A1 * | 12/2001 | Mickols | B01D 71/56 210/490 |
| 2013/0287944 A1 * | 10/2013 | Paul | B01D 67/0093 427/243 |
| 2013/0287945 A1 | 10/2013 | Roy et al. | |
| 2013/0287946 A1 * | 10/2013 | Jons | B01D 67/0093 427/244 |
| 2014/0170314 A1 * | 6/2014 | Zhang | B01D 71/56 427/244 |
| 2014/0199483 A1 * | 7/2014 | Roy | B01D 69/125 427/244 |
| 2014/0206900 A1 | 7/2014 | Qiu et al. | |
| 2014/0272134 A1 * | 9/2014 | Roy | B01D 71/56 427/244 |
| 2014/0370191 A1 * | 12/2014 | Rosenberg | B01D 67/0006 427/244 |
| 2015/0129485 A1 * | 5/2015 | Roy | B01D 69/125 210/489 |
| 2015/0147470 A1 * | 5/2015 | Arrowood | B01D 69/125 427/244 |
| 2015/0157990 A1 * | 6/2015 | Roy | B01D 69/125 210/490 |
| 2015/0165387 A1 * | 6/2015 | Roy | B01D 69/125 210/489 |

FOREIGN PATENT DOCUMENTS

| | | |
|---|---|---|
| WO | 2014014668 | 1/2014 |
| WO | 2014014669 | 1/2014 |
| WO | 2014109946 | 7/2014 |
| WO | 2014109947 | 7/2014 |

OTHER PUBLICATIONS

Petersen, composite reverse osmosis and nanofiltration membranes, Journal of Membrane Science 83, (1993) 81-150.

* cited by examiner

COMPOSITE POLYAMIDE MEMBRANE WITH INCREASED CARBOXYLIC ACID FUNCTIONALITY

FIELD

The present invention is directed toward composite membranes along with methods for making and using the same.

INTRODUCTION

Composite polyamide membranes are used in a variety of fluid separations. One class includes a porous support with a "thin film" polyamide layer. These membranes are commonly referred to as "thin film composite" (TFC) membranes. The thin film polyamide layer may be formed by an interfacial polycondensation reaction between polyfunctional amine (e.g. m-phenylenediamine) and polyfunctional acyl halide (e.g. trimesoyl chloride) monomers which are sequentially coated upon the support from immiscible solutions, see for example U.S. Pat. No. 4,277,344 to Cadotte. Various polyfunctional amine-reactive monomers have been studied. For example, U.S. Pat. No. 4,259,183 to Cadotte describes combinations of bi- and tri-functional acyl halide monomers, e.g. isophthaloyl chloride or terephthaloyl chloride with trimesoyl chloride. WO 2010/120326 describes the use of trimesoyl chloride in combination with its mono and di-hydrolyzed counterparts. Tetraacyl halide monomers are also described in the literature, see for example: i) Lei, Li et al., Polyamide Thin Film Composite Membranes Prepared from Isomeric Biphenyl Tetraacyl Chloride and m-Phenylene diamine, Journal of Membrane Science, 315 (2008), pg 20-27; ii) R.J. Peterson, Composite Reverse Osmosis and Nanofiltration Membranes, Journal of Membrane Science, 83 (1993), pp. 81-150 (see for example pg. 116-117) and U.S. Pat. No. 6,162,358 which both describes the use of adamantane-2,6 dione-1,3,5,7 tetra carbonyl chloride, and iii) CN 102219673 which describes the formation of nano filtration membranes using combinations of 5,5' -methylene diisophthaloyldichloride, trimesoyl chloride and piperazine. Additional constituents have also been added to the coating solution to improve membrane performance. For example, U.S. Pat. No. 6,878,278 to Mickols describes the addition of a tri-hydrocarbyl phosphate compound to the acyl halide coating solution.

The incorporation of carboxylic acid functional groups into the polyamide layer imparts the layer with a more negative charge and this is believed to improve the rejection of certain solutes (e.g. NaCl, nitrate) along with providing the membrane with improved resistance to certain foulants (e.g. silica, humic acid). A portion of the acyl halide groups of the polyfunctional acyl halide monomer inevitably become hydrolyzed during interfacial polymerization (e.g. via reaction with water present in the atmosphere or with water present in the amine coating solution). The overall carboxylic acid content ("dissociated carboxylate content") of the polyamide layer can be further increased by utilizing acyl halide monomers including carboxylic acid functional groups. See for example WO 2010/120326. Unfortunately, the degree of incorporation of such carboxylic acid containing monomers has limits. WO 2010/120326 (see also U.S. Pat. No. 8,177,978) demonstrates an upper limit of 0.02125 wt % of mono hydrolyzed trimesoyl chloride in the coating solution; beyond which the polyamide structure becomes non-functional (See FIG. 14 of WO 2010/120326).

Other approaches which may increase the carboxylic acid content of the polyamide layer involve post-treatment with a chlorinating agent (see for example: U.S. Pat. Nos. 4,277,344, 4,761,234, 5,051,178 and 5,876,602) or the post-application of charged coatings. Unfortunately, post-treatment steps add to the cost and complexity of membrane preparation. Moreover, post-chlorination can compromise long term membrane performance.

SUMMARY

The invention includes thin film composite membranes and methods for making and using the same. In one embodiment, the invention includes a thin film composite membrane including a porous support and a thin film polyamide layer characterized by having a dissociated carboxylate content of at least 0.45 moles/kg at pH 9.5. In another embodiment, the invention includes a method for making a composite polyamide applying a polar solution comprising a polyfunctional amine monomer and a non-polar solution comprising a polyfunctional amine-reactive monomer to a surface of the porous support and interfacially polymerizing the monomers to form a thin film polyamide layer, wherein the method is characterized by the non-polar solution comprising at least 0.025 wt % of an acid compound including at least one carboxylic acid moiety and at least one amine-reactive moiety selected from acyl halide and anhydride. Many additional embodiments are included.

DETAILED DESCRIPTION

The invention includes thin film composite membranes and methods for making and using the same. The invention is not particularly limited to a specific type, construction or shape of composite membrane or application. For example, the present invention is applicable to flat sheet, tubular and hollow fiber polyamide membranes useful in a variety of applications including forward osmosis (FO), reverse osmosis (RO) and nano filtration (NF). RO composite membranes are relatively impermeable to virtually all dissolved salts and typically reject more than about 95% of salts having monovalent ions such as sodium chloride. RO composite membranes also typically reject more than about 95% of inorganic molecules as well as organic molecules with molecular weights greater than approximately 100 Daltons. NF composite membranes are more permeable than RO composite membranes and typically reject less than about 95% of salts having monovalent ions while rejecting more than about 50% (and often more than 90%) of salts having divalent ions—depending upon the species of divalent ion. NF composite membranes also typically reject particles in the nanometer range as well as organic molecules having molecular weights greater than approximately 200 to 500 Daltons.

The subject method involves forming a thin film polyamide layer upon a porous support. The porous support is not particularly limited and preferably includes a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 μm. Non-limiting examples of porous supports include those made of: polysulfone, polyether sulfone, polyimide, polyamide, polyetherimide, polyacrylonitrile, poly (methyl methacrylate), polyethylene, polypropylene, and various halogenated polymers such as polyvinylidene fluoride.

The thin film polyamide layer is preferably prepared by an interfacial polycondensation reaction between a polyfunctional amine monomer and a polyfunctional amine-reactive monomer upon the surface of the porous support as described in U.S. Pat. Nos. 4,277,344 and 6,878,278. As used herein, the terms "polyfunctional amine monomer" and "polyfunctional amine-reactive monomer" refer to both single and multiple species combined). The term "polyamide" refers to a polymer in which amide linkages (—C(O)NH—) occur along the molecular chain. The polyfunctional amine and polyfunctional amine-reactive monomers are most commonly applied to the porous support by way of a coating step from solution, wherein the polyfunctional amine monomer is preferably coated from an aqueous-based or polar coating solution and the polyfunctional amine-reactive monomer from an organic-based or non-polar coating solution. Once brought into contact with one another, the polyfunctional amine-reactive and polyfunctional amine monomers react at their surface interface to form a polyamide layer or film. This layer, often referred to as a polyamide "discriminating layer" or "thin film layer," provides the composite membrane with its principal means for separating solute (e.g. salts) from solvent (e.g. aqueous feed). The reaction time of the polyfunctional amine-reactive monomer and the polyfunctional amine monomer may be less than one second but contact times typically range from about 1 to 60 seconds, after which excess liquid may be optionally removed by way of an air knife, water bath(s), dryer or the like. The removal of the excess solution can be achieved by drying at elevated temperatures, e.g. from about 40° C. to about 120° C., although air drying at ambient temperatures may be used. Although the coating steps need not follow a specific order, the polyfunctional amine monomer is preferably coated first followed by the polyfunctional amine-reactive monomer. Coating can be accomplished by spraying, film coating, rolling or through the use of a dip tank among other coating techniques.

The polyfunctional amine monomer includes at least two primary or secondary amino groups and may be aromatic (e.g., m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., piperazine, ethylenediamine, propylenediamine, and tris (2-diaminoethyl) amine). Examples of preferred polyfunctional amine monomers include primary amines having two or three amino groups, for example, m-phenylene diamine, and secondary aliphatic amines having two amino groups such as piperazine. One preferred polyfunctional amine is m-phenylene diamine (mPD). The polyfunctional amine monomer may be applied to the porous support as part of a coating solution including a polar solution. The polar coating solution may contain from about 0.1 to about 20 weight percent and more preferably from about 0.5 to about 6 weight percent polyfunctional amine monomer. Once coated on the porous support, excess coating solution may be optionally removed.

The polyfunctional amine-reactive monomer includes at least two and preferably two to four amine-reactive moieties selected from: acyl halide, sulfonyl halide and anhydride. The monomer may be aromatic or aliphatic (straight chain or cyclic). Individual species may be used alone or in combination. Non-limiting examples of aromatic polyfunctional acyl halides include: trimesic acid chloride, terephthalic acid chloride, isophthalic acid chloride, biphenyl dicarboxylic acid chloride, and naphthalene dicarboxylic acid dichloride. Non-limiting examples of alicyclic polyfunctional acyl halides include: cyclopropane tri carboxylic acid chloride, cyclopentane tri carboxylic acid chloride, cyclohexane tri carboxylic acid chloride, cyclopentane dicarboxylic acid chloride, cyclobutane dicarboxylic acid chloride, cyclohexane dicarboxylic acid chloride, and tetrahydrofuran dicarboxylic acid chloride. Non-limiting examples of aliphatics include adipoyl chloride, malonyl chloride, glutaryl chloride, and sebacoyl chloride. One particularly preferred polyfunctional amine-reactive monomer is trimesoyl chloride (TMC). Representative polyfunctional amine-reactive monomers also include a tetraacyl halide monomers as represented by Formula I:

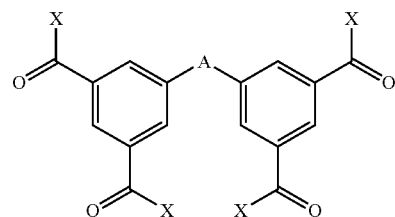

Formula I wherein A is selected from: oxygen (—O—), carbon (—C—), silicon (—Si—), sulfur (—S—) and nitrogen (—N—) which may be unsubstituted or substituted, e.g. with alkyl groups of 1-4 carbon atoms; or a carbonyl group (—C(O)—). X is the same or different and is selected from a halogen. In a preferred embodiment, each X is chlorine. In another preferred embodiment, A is an unsubstituted carbon, i.e. the subject monomer is 5,5'-methylene diisophthaloyl dichloride.

Additional examples of amine-reactive monomers including the aforementioned species wherein one or more of the acyl halide moieties are replaced with a sulfonyl halide or anhydride, or a combination, e.g. 3-(chlorosulfonyl)benzoyl chloride, 3,5-bis(chlorosulfonyl)benzoyl chloride, 1,3-dioxo-1,3-dihydroisobenzofuran-5-carbonyl chloride, 1,3-dioxo-1,3-dihydroisobenzofuran-5-sulfonyl chloride, benzo[1,2-c:4,5-c']difuran-1,3,5,7-tetraone, and 5-(chlorosulfonyl)isophaloyl dichloride. In a preferred embodiment, the interfacial polymerization between the polyfunctional amine and amine-reactive monomers is conducted in the presence of an acid compound. The acid compound may be coated from a separate coating solution or in some embodiments, combined and coated from the aforementioned non-polar coating solution. The acid compound is not particularly limited and includes at least one carboxylic acid moiety (or salt thereof) and at least one amine-reactive moiety selected from acyl halide and anhydride. Representative acid compounds include mono and di-hydrolyzed counterparts of the aforementioned polyfunctional acyl halide monomers along with the mono, di and tri-hydrolyzed counterparts of the tetraacyl halide monomers described above. Preferred acid compounds include the mono-hydrolyzed trimesoyl chloride (mhTMC) i.e. 1-carboxy-3,5-dichloroformyl benzene and the mono-hydrolyzed isophthaloyl chloride (mhIPC). Additional examples include that represented by Formula (II):

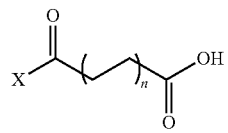

Formula (II)

wherein X is a halogen (preferably chlorine) and n is an integer from 1 to 10. Representative species include: 4-(chlorocarbonyl) butanoic acid; 5-(chlorocarbonyl) pentanoic acid; 6-(chlorocarbonyl) hexanoic acid; 7-(chlorocarbonyl) heptanoic acid; 8-(chlorocarbonyl) octanoic acid; 9-(chlorocarbonyl) nonanoic acid and 10-(chlorocarbonyl) decanoic acid. While the acyl halide and carboxylic acid groups are shown in terminal positions, one or both may be located at alternative positions along the aliphatic chain. While not shown in Formula (II), the aliphatic reactant may include additional carboxylic acid and acyl halide groups. Additionally, corresponding aromatic species may be used including 3-carboxybenzoyl chloride and 4-carboxybenzoyl chloride.

Non-limiting examples of acid compounds including a carboxylic acid moiety and anhydride moiety include: 3,5-bis(((butoxycarbonyl)oxy)carbonyl)benzoic acid, 1,3-dioxo-1,3-dihydroisobenzofuran-5-carboxylic acid, 3-(((butoxycarbonyl)oxy)carbonyl)benzoic acid, and 4-(((butoxycarbonyl)oxy)carbonyl)benzoic acid.

In some embodiments, the acid compound serves as the polyfunctional amine-reactive monomer, i.e. only one acyl halide containing species is used to form the polyamide layer. Non-limiting examples include mono-, di- or tri-hydrolyzed versions of compounds represented by Formula (I). In such embodiments, the acyl halide compound has multiple acyl halide moieties and serves as a monomer in the formation of polyamide and includes at least one carboxylic acid moiety which increases the overall carboxylic acid content of the resulting polyamide layer. However, in preferred embodiments the polyfunctional amine-reactive monomer and acid compound are distinct species, e.g. one species includes at least one carboxylic acid moiety and the other contains none. A representative example is TMC and mono-hydrolyzed TMC. Whether single or multiply species are used, they are preferably coated from a common non-polar coating solution having a total acyl halide content of at least 0.15 wt % (e.g. 0.15 to 5 wt %). As used herein, the term "acyl halide content" refers to the concentration of compounds including at least one acyl halide moiety, as measured by weight and common dilution practices. When used as separate species, the coating solution preferably comprises at least 0.025 wt % and in some embodiments at least 0.05, 0.06, 0.07, 0.075 or 0.078 wt % of the acid compound, wherein the acid compound includes at least one carboxylic acid moiety and the polyfunctional amine-reactive monomer includes no carboxylic acid moieties. A preferred upper limit for the acid compound is 0.25 wt %, 0.15 wt %, 0.010 wt % and in some embodiments, equal to or less than 0.08 wt %. The coating solution may be applied to the porous support as part of a continuous or batch coating operation. Suitable non-polar solvents are those which are capable of dissolving the acid compounds and which are immiscible with water, e.g. hexane, cyclohexane, heptane and halogenated hydrocarbons such as the FREON series. Preferred solvents include those which pose little threat to the ozone layer and which are sufficiently safe in terms of flashpoints and flammability to undergo routine processing without taking special precautions. A preferred solvent is ISOPAR™ available from Exxon Chemical Company. The coating solution may optionally include additional materials including co-solvents, phase transfer agents, solubilizing agents and complexing agents wherein individual additives may serve multiple functions. Representative co-solvents include: benzene, toluene, xylene, mesitylene, ethyl benzene diethylene glycol dimethyl ether, cyclohexanone, ethyl acetate, butyl carbitol™ acetate, methyl laurate and acetone.

In another embodiment, the subject method includes the step of conducting the interfacial polymerization in the presence of a tri-hydrocarbyl phosphate compound. The means of applying the tri-hydrocarbyl phosphate compound to the porous support are not particularly limited, e.g. the tri-hydrocarbyl phosphate compound may be included in one or both of the aforementioned coating solutions or may be coated from a separate coating solution before or during the interfacial polymerization. In a preferred embodiment, the tri-hydrocarbyl phosphate compound is added to the coating solution used to apply the polyfunctional amine-reactive monomer to the porous support. In preferred embodiments, the tri-hydrocarbyl phosphate compound is present during the interfacial polymerization in a molar ratio with the acid compounds of at least 0.1:1, 0.5:1, 1:1, 1.1:1, 1.2:1, 1.5:1 or 2:1. Preferred ranges of molar ratios (tri-hydrocarbyl phosphate compound to polyfunctional amine-reactive monomer include: 1:1 to 5:1, 1.2:1 to 4:1, 1.5: to 3:1 and 2:1 to 3:1.

Representative examples of applicable tri-hydrocarbyl phosphate compounds are described in U.S. Pat. No. 6,878, 278. A preferred class of such compounds includes those represented by Formula (III):

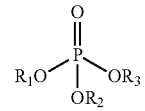

Formula (III)

wherein "P" is phosphorous, "O" is oxygen and $R_1$, $R_2$ and $R_3$ are independently selected from hydrogen and hydrocarbyl groups comprising from 1 to 10 carbon atoms, with the proviso that no more than one of $R_1$, $R_2$ and $R_3$ are hydrogen. $R_1$, $R_2$ and $R_3$ are preferably independently selected from aliphatic and aromatic groups. Applicable aliphatic groups include both branched and unbranched species, e.g. methyl, ethyl, propyl, isopropyl, butyl, isobutyl, pentyl, 2-pentyl, 3-pentyl. Applicable cyclic groups include cyclopentyl and cyclohexyl. Applicable aromatic groups include phenyl and naphthyl groups. Cyclo and aromatic groups may be linked to the phosphorous atom by way of an aliphatic linking group, e.g., methyl, ethyl, etc. The aforementioned aliphatic and aromatic groups may be unsubstituted or substituted (e.g., substituted with methyl, ethyl, propyl, hydroxyl, amide, ether, sulfone, carbonyl, ester, cyanide, nitrile, isocyanate, urethane, beta-hydroxy ester, etc); however, unsubstituted alkyl groups having from 3 to 10 carbon atoms are preferred. Specific examples of tri-hydrocarbyl phosphate compounds include: tripropyl phosphate, tributyl phosphate, tripentyl phosphate, trihexyl phosphate, triphenyl phosphate, propyl biphenyl phosphate, dibutyl phenyl phosphate, butyl diethyl phosphate, dibutyl hydrogen phosphate, butyl heptyl hydrogen phosphate and butyl heptyl hexyl phosphate.

The subject method provides a route for making a thin film polyamide layer that possess higher carboxylate content as compared with that described in the literature. In a preferred embodiment, the thin film polyamide layer is characterized by having a dissociated carboxylate content of at least 0.45, 0.50, 0.55 and preferably at least 0.6 moles/kg of polyamide at pH 9.5 as measured by the technique described below.

The moles of carboxylic acids groups per unit area of membrane is indicative of the number of interactions seen by a species passing through the membrane, and a larger number will thus favorably impact salt passage. This value may be calculated by multiplying the measured carboxylate content by a measured thickness and by the polyamide density. Alternatively, the carboxylate number per unit area of membrane (moles/m2) may be determined more directly by methods that measure the total complexed metal within a known area. Approaches using both Uranyl acetate and toluidine blue 0 dye are described in: Tiraferri, et. al., Journal of Membrane Science, 2012, 389. 499-508, An approach to determine the complexed cation (sodium or potassium) content in membranes by polymer ashing is described in (Wei Xie, et al., *Polymer,* Volume 53, Issue 7, 22 Mar. 2012, Pages 1581-1592).

A preferred method to determine the dissocated carboxylate number at pH 9.5 per unit area of membrane for a thin film polyamide membrane is as follows. A membrane sample is boiled for 30 minutes in deionized water, then placed in a 50 wt % solution of methanol in water to soak overnight. Next, the membrane sample is immersed in a $1\times10^{-4}$M $AgNO_3$ solution with pH adjusted to 9.5 with NaOH for 30 minutes. After soaking in the silver ion solution, the unbound silver is removed by soaking the membranes twice in dry methanol for 30 minutes. The amount of silver per unit area is preferably determined by ashing, as described by Wei, and redissolving for measurement by ICP. Preferably, the dissocated carboxylate number at pH 9.5 per square meter of membrane is greater than $6\times10^{-5}$, $8\times10^{-5}$, $1\times10^{-4}$, $1.2\times10^{-4}$, $1.5\times10^{-4}$, $2\times10^{-4}$, or even $3\times10^{-4}$ moles/m$^2$.

In yet another preferred embodiment, the subject membranes have an isoelectric point (IEP) of less than or equal to 3.5, as measured using a standard zeta-potential measurement method as described below.

Polymers having higher modulus and lower critical strain are generally less elastic and may undergo less deformation under stress and maintain their conformational stability. While not wishing to be bound by theory, inventors believe these characteristics of a more rigid polymer contribute decreased salt passage. Measurement of these parameters for thin films including polyamide membranes have been demonstrated in ("Chung, J. Y.; Nolte, A. J.; Stafford, C. M., "Surface Wrinkling: A Versatile Platform for Measuring Thin-Films Properties", *Adv. Mater.* 2011, 23, 349-368.; Chung, J. Y.; Lee, J. H.; Beers, K. L.; Stafford, C. M.; "Stiffness, Strength, and Ductility of nanoscale thin Films and membranes: A Combine Wrinkling-Cracking Methodology", *Nano Lett.* 2011, 11, 3361-3365.; Chung, J. Y.; Chastek, T. Q.; Fasolka, M. J.; Ro, H. W.; Stafford, C. M., "Quantifying Residual Stress in Nanoscale Thin Polymer Films via Surface Wrinkling", *ACS Nano* 2009, 3, 844-852.) The absolute modulus value determined depends on measured thickness, which can be determined by either AFM or stylus profilimetry. The measurement of the critical strain value, however, was found to be independent of the thin film thickness. In a preferred embodiment, the critical strain for polyamide from the inventive membranes is less than 10%.

In another preferred embodiment, the subject membranes have improved flux as compared with comparable membranes prepared without the subject acid compounds. In another embodiment, the subject membranes also maintain comparable NaCl passage values, e.g. less than 1% when tested using a 2000 ppm NaCl solution at 150 psi, 25° C. and pH 8. In another embodiment, the subject membranes have a NaCl passage value less than 5% when tested under such conditions.

In another preferred embodiment, the subject composite membrane is not subject to post-treatment with a chlorinating agent.

While post application coatings may be used in combination with the present invention, in many preferred embodiments, no such coating is used, i.e. no coating of polyacrylic acid or polyvinyl acetate.

EXAMPLES

Sample membranes were prepared using a pilot scale membrane manufacturing line. Polysulfone supports were casts from 16.5 wt % solutions in dimethylformamide (DMF) and subsequently soaked in an aqueous solution of 3.5 wt % meta-phenylene diamine (mPD). The resulting support was then pulled through a reaction table at constant speed while a thin, uniform layer of a non-polar coating solution was applied. The non-polar coating solution included a isoparaffinic solvent (ISOPAR L), a combination of trimesoyl acid chloride (TMC) and 1-carboxy-3,5-dichloroformyl benzene (mhTMC) in varying ratios while maintaining the total acid chloride content at 0.26 wt %, and tributyl phosphate (TBP) in a constant stoichiometric molar ratio of 1.1:1 with TMC. Excess non-polar solution was removed and the resulting composite membrane was passed through water rinse tanks and drying ovens. Coupons of the sample membranes were then subject to standard testing using an aqueous salt solution (2000 ppm NaCl) at 150 psi, pH 8 and 25° C. The dissociated carboxylate content and isoelectric point (IEP) for the sample membranes was also determined (as per the methodologies described below). Critical strain was measured as per (Chung, J. Y.; Lee, J. H.; Beers, K. L.; Stafford, C. M.; "Stiffness, Strength, and Ductility of nanoscale thin Films and membranes: A Combine Wrinkling-Cracking Methodology", *Nano Lett.* 2011, 11, 3361-3365.) The results are summarized in Table 1. A second set of similar membranes were prepared without TBP and the results are summarized in Table 2.

TABLE 1

| Sample No. | mhTMC (wt %) | FLUX (GFD) (Standard Dev) | NaCl Passage (%) (Standard Dev) | Dissociated Carboxylate Content (moles/kg) | Critical Strain (%) | Isoelectric Point (IEP) |
|---|---|---|---|---|---|---|
| 1-1 | 0 | 46.90 (1.81) | 0.86 (0.074) | 0.156 | 9.05 | 4.26 |
| 1-2 | 0.0065 | 45.75 (1.05) | 0.49 (0.037) | 0.188 | | 4.11 |
| 1-3 | 0.013 | 44.09 (0.91) | 0.42 (0.063) | 0.229 | 6.6 | 3.94 |
| 1-4 | 0.026 | 43.65 (2.06) | 0.37 (0.037) | 0.303 | | 3.76 |

TABLE 1-continued

| Sample No. | mhTMC (wt %) | FLUX (GFD) (Standard Dev) | NaCl Passage (%) (Standard Dev) | Dissociated Carboxylate Content (moles/kg) | Critical Strain (%) | Isoelectric Point (IEP) |
|---|---|---|---|---|---|---|
| 1-5 | 0.052 | 48.61 (1.33) | 0.43 (0.029) | 0.442 | | 3.72 |
| 1-6 | 0.078 | 53.58 (1.37) | 0.75 (0.062) | 0.556 | 4.6 | 3.5 |
| 1-7 | 0.104 | 49.47 (1.93) | 4.51 (0.263) | 0.874 | | 3.36 |

TABLE 2

| Sample No. | mhTMC (wt %) | FLUX (GFD) (Standard Dev) | NaCl Passage (%) (Standard Dev) | Dissociated Carboxylate Content (moles/kg) | Critical Strain (%) | Isoelectric Point (IEP) |
|---|---|---|---|---|---|---|
| 2-1 | 0 | 13.64 (0.63) | 1.10 (0.036) | 0.17 | | 4.02 |
| 2-2 | 0.0065 | 10.14 (0.91) | 1.18 (0.039) | 0.239 | 16.9 | 3.94 |
| 2-3 | 0.013 | 11.02 (0.50) | 1.41 (0.058) | 0.321 | | 3.98 |
| 2-4 | 0.019 | 13.55 (0.52) | 0.99 (0.134) | 0.356 | | 3.87 |
| 2-5 | 0.026 | 8.95 (0.50) | 1.81 (0.061) | 0.428 | 12.8 | 3.92 |

The "dissociated carboxylate content" of the polyamide layer of the sample membranes was determined by silver titration and a Rutherford Backscattering measurement as described below.

(i) Samples membranes (1 inch×6 inch) were boiled for 30 minutes in deionized water (800 mL), then placed in a 50/50 wt % solution of methanol and water (800 mL) to soak overnight. Next, 1 inch×1 inch size sample of these membranes were immersed in a 20 mL $1 \times 10^{-4}$ M $AgNO_3$ solution with pH adjusted to 9.5 for 30 minutes. Vessels containing silver ions were wrapped in tape and to limit light exposure. After soaking with the silver ion solution, the unbound silver was removed by soaking the membranes in 2 clean 20 mL aliquots of dry methanol for 5 minutes each. Finally, the membranes were allowed to dry in a nitrogen atmosphere for a minimum of 30 minutes.

(ii) Rutherford Backscattering (RBS) Measurement: Membrane samples were mounted on a thermally and electrically conductive double sided tape, which was in turn mounted to a silicon wafer acting as a heat sink The tape used was Chromerics Thermattach T410 or a 3M copper tape. RBS measurements were obtained with a Van de Graff accelerator (High Voltage Engineering Corp., Burlington, MA); A 2 MeV He room temperature beam with a diameter of 3 mm was used at an incident angle of 22.5°, exit angle of 52.5°, scattering angle of 150°, and 40 nanoamps (nAmps) beam current. Membrane samples were mounted onto a movable sample stage which is continually moved during measurements. This movement allows ion fluence to remain under $3 \times 10^{14}$ $He^+/cm^2$.

(iii) Data Analysis: Analysis of the spectra obtained from RBS was carried out using SIMNRA®, a commercially available simulation program. A description of its use to derive the elemental composition from RBS analysis of RO/NF membranes has been described by Coronell, O., et. al. in *J. of Membrane Sci.* 2006, 282, 71-81 and in *Environmental Science & Technology* 2008, 42(14), 5260-5266. Data in tables were obtained using the SIMNRA® simulation program to fit a two layer system, a thick polysulfone layer beneath a thin polyamide layer, and fitting a three-layer system (polysulfone, polyamide, and surface coating) can use the same approach. The atom fraction composition of the two layers (polysulfone before adding the polyamide layer, and the surface of final TFC polyamide layer) was measured first by XPS to provide bounds to the fit values. As XPS cannot measure hydrogen, an H/C ratio from the proposed molecular formulas of the polymers, 0.667 for polysulfone and a range of 0.60-0.67 was used for polyamide. Although the polyamides titrated with silver nitrate only introduces a small amount of silver, the scattering cross section for silver is substantially higher than the other low atomic number elements (C, H, N, O, S) and the size of the peak is disproportionately large to the others despite being present at much lower concentration thus providing good sensitivity. The concentration of silver was determined using the two layer modeling approach in SIMNRA® by fixing the composition of the polysulfone and fitting the silver peak while maintaining a narrow window of composition for the polyamide layer (layer 2, ranges predetermined using XPS). From the simulation, a molar concentration for the elements in the polyamide layer (carbon, hydrogen, nitrogen, oxygen and silver) was determined. The silver concentration is a direct reflection of the carboxylate molar concentration available for binding silver at the pH of the testing conditions.

While not used in the present experiments, the carboxylic acid content of TFC polyamide membranes (moles/kg of polyamide) can also be determined using the measured polyamide mass per unit area and the moles of carboxylic acids groups per unit area, such as by complexation and quantification methods previously described.

The isoelectric point for the sample membranes was determined using a standard Zeta-Potential technique with a quartz cell by electrophoretic light scattering (ELS) using Desal Nano HS instrument. Membrane samples (2 inch×1 inch) were first boiled for 20 minutes in DI water, then rinsed well with room temperature DI water and stored at room temperature in a fresh DI solution overnight. The samples were then loaded as per reference: 2008 "User's Manual for the Delsa™ Nano Submicron Particle Size and Zeta Potential," and the "Pre-Course Reading" for the same instrument presented by Beckmann Coulter. The pH titration was done over a range from pH 10 to pH 2 and isoelectric point was determined at the pH where the zeta potential became zero.

The highly charged membrane of this invention is particularly relevant for use with feed streams having concentrations of silicon (e.g. silica, silicates) greater 15 ppm in the feed or greater than 80 ppm in the concentrate, for use in waters comprising an anionic surfactant and oil emulsion (preferably greater than 10 ppm hydrocarbon in the feed water), for use in treating produced water containing at least 50 ppm hydrocarbon in the feed water, reverse osmosis elements operating with recoveries greater than 30%, and elements operating in the second pass of a reverse osmosis system (e.g. following a first pass seawater stage), particularly wherein the feed water to the second pass elements has a TDS of less than 500 ppm, or even less than 200 ppm.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention. The entire subject matter of each of the aforementioned US patent documents is incorporated herein by reference.

The invention claimed is:

1. A thin film composite polyamide membrane comprising a porous support and a thin film polyamide layer characterized by having a dissociated carboxylate content of 0.45 moles/kg to 0.556 moles/kg at pH 9.5, and wherein the composite polyamide membrane has a NaCl Passage of less than 1% when tested using an aqueous salt solution (2000 ppm NaCl) at 150 psi, pH 8 and 25° C.

2. The membrane of claim 1 wherein the polyamide layer has an isoelectric point of less than or equal to 3.5.

3. The membrane of claim 1 wherein the polyamide layer forms an outer surface of the membrane without the presence of an additional outer coating.

4. A method for making a composite polyamide membrane including a porous support and a thin film polyamide layer comprising the steps of applying the following monomers to a surface of the porous support and interfacially polymerizing the monomers to form a thin film polyamide layer:
   i) a polar solution comprising a polyfunctional amine monomer and
   ii) a non-polar solution comprising a polyfunctional amine-reactive monomer comprising at least two moieties selected from: acyl halide, sulfonyl halide and anhydride,
   wherein the method is characterized by the non-polar solution further comprising 0.25 wt % to 0.078 wt % of an acid compound comprising at least one carboxylic acid moiety and at least one amine-reactive moiety selected from: acyl halide and anhydride and
   wherein the interfacial polymerization is conducted in the presence of a tri-hydrocarbyl phosphate compound provided in a molar ratio of at least 0.5:1 with the polyfunctional amine-reactive monomer.

5. The method of claim 4 wherein the polyfunctional amine-reactive monomer comprises from two to four acyl halide moieties and the acid compound comprises one acyl halide moiety and at least one carboxylic acid moiety.

6. The method of claim 4 wherein the acid compound comprises at least two acyl halide moieties and at least one carboxylic acid moiety.

* * * * *

UNITED STATES PATENT AND TRADEMARK OFFICE
CERTIFICATE OF CORRECTION

PATENT NO. : 9,610,542 B2
APPLICATION NO. : 14/406994
DATED : April 4, 2017
INVENTOR(S) : Abhishek Roy et al.

Page 1 of 1

It is certified that error appears in the above-identified patent and that said Letters Patent is hereby corrected as shown below:

In the Claims

In Claim 4 at Column 12, Line 23, the number "0.25" should be replaced with --0.025--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*